US010611642B2

(12) United States Patent
Haon et al.

(10) Patent No.: US 10,611,642 B2
(45) Date of Patent: Apr. 7, 2020

(54) SIOC COMPOSITE ELECTRODE MATERIAL (71) Applicants: COMMISSARIAT Á L'ENERGIE ATOMIQUE ET AUX ENERGIES ALTERNATIVES, Paris (FR); JNC CORPORATION, Tokyo (JP)

(72) Inventors: Cédric Haon, Grenoble (FR); Aurélien Riviere, Areines (FR); Ohno Katsuhiko, Tokyo (JP); Iwatani Keizo, Ichihara (JP); Takano Yoshihito, Ichihara (JP); Kizaki Tetsuro, Ichihara (JP); Kondo Masakazu, Ichihara (JP); Kanao Keiichiro, Tokyo (JP)

(73) Assignees: COMMISSARIAT À L'ENERGIE ATOMIQUE ET AUX ENERGIES ALTERNATIVES, Paris (FR); JNC CORPORATION, Rokyo (JP)

( * ) Notice: Subject to any disclaimer, the term of this patent is extended or adjusted under 35 U.S.C. 154(b) by 0 days.

(21) Appl. No.: 15/525,100

(22) PCT Filed: Nov. 5, 2015

(86) PCT No.: PCT/EP2015/075839
§ 371 (c)(1),
(2) Date: May 8, 2017

(87) PCT Pub. No.: WO2016/071462
PCT Pub. Date: May 12, 2016

(65) Prior Publication Data
US 2017/0320744 A1 Nov. 9, 2017

(30) Foreign Application Priority Data
Nov. 6, 2014 (EP) ..................... 14306778

(51) Int. Cl.
*C01B 32/907* (2017.01)
*H01M 4/136* (2010.01)
*H01M 4/58* (2010.01)
*C01B 33/00* (2006.01)

(52) U.S. Cl.
CPC ............ *C01B 32/907* (2017.08); *C01B 33/00* (2013.01); *H01M 4/136* (2013.01); *H01M 4/58* (2013.01)

(58) Field of Classification Search
CPC ........ H01M 4/58; H01M 4/136; C01B 32/907
See application file for complete search history.

(56) References Cited

FOREIGN PATENT DOCUMENTS

EP 2 461 397 A1 6/2012
WO 2014/098070 A1 6/2014

OTHER PUBLICATIONS

Kaspar et al., "Silicon oxycarbide/nano-silicon composite anodes for Li-ion batteries: Considerable influence of nano-crystalline vs. nano-amorphous silicon embedment on the electrochemical properties", Journal of Power Sources v. 269, pp. 164-172 (2014).*
Hiroshi Fukui et al., "A Si—O—C Composite Anode: High Capability and Proposed Mechanism of Lithium Storage Associated With Microstructural Characteristics", Applied Materials & Interfaces, vol. 2, No. 4, (2010), pp. 998-1008.
Hiroshi Fukui et al., "Influence of Polystyrene/Phenyl Substituents in Precursors on Microstructures of Si—O—C Composite Anodes for Lithium-Ion Batteries", Journal of Power Sources, vol. 196 (2011), pp. 371-378.
Hiroshi Fukui et al., "Structures and Lithium Storage Performance of Si—O—C Composite Materials Depending on Pyrolysis Temperatures", Journal of Power Sources, vol. 243, (2013), pp. 152-158.
Jan Kaspar et al., "Lithium Insertion Into Carbon-Rich SiOC Ceramics: Influence of Pyrolysis Temperature on Electrochemical Properties", Journal of Power Sources, vol. 244, (2013) pp. 450-455.
Dec. 3, 2015 Search Report issued International Patent Application No. PCT/EP2015/075839.
Dec. 3, 2015 Written Opinion issued in International Patent Application No. PCT/EP2015/075839.

* cited by examiner

*Primary Examiner* — Ladan Mohaddes
(74) *Attorney, Agent, or Firm* — Oliff PLC (57) ABSTRACT

A SiOC composite material in microparticulate form, wherein the microparticles are formed, in whole or in part, of an amorphous SiOC matrix with Si ranging from 20 wt % to 60 wt %, O from 20 wt % to 40 wt % and C from 10 wt % to 50 wt %, based on the total weight of the SiOC matrix, wherein amorphous or crystallized silicon particles are embedded within the SiOC matrix and wherein the microparticles are of core/coating structure with a core formed of the amorphous SiOC matrix and coated with at least one amorphous carbon layer; and to a method for producing such SiOC composite material. It also relates to an electrode active material, an electrode and a battery, especially a lithium-ion battery, including the aforementioned SiOC composite material.

20 Claims, 7 Drawing Sheets

SIOC COMPOSITE ELECTRODE MATERIAL

The present invention is directed to a new silicon oxycarbide (SiOC) composite material in microparticulate form useful as electrode active material, in particular for a lithium-ion battery anode, and method for producing such a SiOC particulate material. These electrodes can be used to form batteries with high capacities and long-time stability upon cycling.

Lithium-ion batteries are widely used as electric sources for example for lap top computers, cellular phones and camcorders. Rechargeable lithium ion batteries have a simple mechanism. During charge, lithium ions are extracted from the cathode and inserted as lithium into the anode. On discharge, the reverse process occurs. The electrodes used in these batteries are very important and can have dramatic effects on the batteries performance.

The most common anode materials to date have been carbonaceous compounds such as graphite. Unfortunately, conventional graphite anode material faces limitation due to low theoretical specific capacity of 372 mAh·$g^{-1}$.

Yet, cells with larger capacities are often required for high energy applications of Li-ion batteries.

In order to improve the capacity of the batteries, studies have been conducted to replace graphite anode material in Li-ion batteries. In this respect, silicon has shown promising results thanks to its very high theoretical capacity (3600 mAh·$g^{-1}$). However, lithium insertion into bulk silicon material causes large volume expansion leading to fast loss of performance upon charge/discharge cycling.

Among several alternatives, silicon oxycarbide (SiOC) materials can be of great interest and various works about synthesis of such materials have been reported in the literature.

For example, Fukui et al. [1] proposed to prepare SiOC material for anode application from the pyrolysis of polysilane material $(Ph_2Si)_{0.85}(PhSi)_{0.15}$. They also studied the result of pyrolysing a mixture of polysilane starting material with polystyrene, and showed that it leads to the formation of a SiOC composite containing electrochemically active free carbon and having microporosity that enables better electrochemical performance than the one obtained from pure polysilane. This material thus offers a first lithiation capacity of about 850 mAh·$g^{-1}$ and a first coulombic efficiency of 70%. The influence of phenyl substituents in polysilane precursors on SiOC microstructure [2], or of pyrolysis temperature on lithium storage performance of SiOC material ([3], [4]) has also been investigated. It has been shown that a material prepared by pyrolysing at 700° C. displays improved performance with an average capacity of around 450 mAh·$g^{-1}$, whereas high pyrolysis temperatures lead to the formation of inactive crystalline SiC phase and increased carbon organization providing less Li-ion storing sites, thus to degraded electrochemical performance. Mention may also be made of document EP 2 104 164 relating to the aforementioned studies that reports the production of a porous silicon oxycarbide material by carbonizing both a silicon metal or a silicon-containing compound such as polysilane, and an organic compound containing no silicon atoms and having a softening point or a melting point, in an inert gas or in a vacuum at a temperature ranging from 300° C. to 1,500° C., for example polystyrene.

Following a similar approach, Dahn et al. (EP 0 867 958) propose silicon oxycarbide electrode materials for lithium ion batteries produced from the pyrolysis of a silicon-containing preceramic polymer. The obtained SiOC material is thereafter treated with a strong acid or a strong base to reduce the Si and O contents as well as increase the surface area and open porosity.

However, the currently proposed silicon oxycarbide materials display insufficient electrochemical performance in practical use for the desired high energy Li-ion battery.

Consequently, there remains a need to produce silicon-based materials for electrodes, in particular for lithium-ion battery anode, capable of insuring high capacity and long time stability upon cycling.

The present invention specifically aims to provide a new silicon oxycarbide composite material as electrode active material that satisfies the aforementioned requirements.

In particular, the present invention relates, according to a first one of its aspects, to a SiOC composite material in microparticulate form, characterized in that the microparticles are formed, in whole or in part, of an amorphous SiOC matrix with Si ranging from 20 wt % to 60 wt %, O from 20 wt % to 40 wt % and C from 10 wt % to 50 wt %, based on the total weight of the SiOC matrix, wherein amorphous or crystallized silicon particles are embedded within said SiOC matrix and wherein the microparticles are of core/coating structure with a core formed of said amorphous SiOC matrix and coated with at least one amorphous carbon layer.

Against all expectations, the inventors have discovered that such a particulate SiOC composite material can provide the batteries with highly desirable properties in terms of high capacity and cycle durability.

Thus, according to another of its aspects, the invention relates to the use of a SiOC composite material as defined above as an electrode active material. Another subject of the present invention is also an electrode active material comprising at least the aforementioned SiOC composite material.

The invention also relates to an electrode comprising such an electrode active material.

An electrode active material in accordance with the invention is particularly suitable for an anode electrode, in particular for a lithium-ion battery, and especially for a lithium-ion secondary battery.

Thus, according to still another of its aspects, an object of the present invention is a battery, in particular a lithium-ion secondary battery, comprising an electrode, preferably a negative electrode, using the aforementioned SiOC composite material.

Advantageously, the electrode active material according to the invention makes it possible to attain improved electrochemical performances both in terms of superior reversible capacity and cycle durability, as demonstrated in the examples that follow. More particularly, the electrodes formed from said SiOC composite material have the ability to store large quantities of lithium. Further, the initial capacity of the battery can be maintained through several charge/discharge cycles of the battery. In particular, a lithium-ion battery using a SiOC composite material according to the invention displays an average capacity higher than 700 mAh/g on a large number of charge/discharge cycles.

Moreover, as detailed below, the electrode material according to the invention can be prepared by a simple preparation method from an industrial point of view. Thus, it is further an object of the instant invention to provide a method for producing a SiOC composite material according to the invention.

Other features, advantages and modes of application of the SiOC composite material, process for its preparation and their implementation according to the invention will emerge more clearly on reading the following description and examples.

In the remainder of the text, the expressions "between . . . and . . . ", "ranging from . . . to . . . " and "varying from . . . to . . . " are equivalent and are understood to mean that the limits are included, unless otherwise mentioned.

In the framework of the present invention, the term "microparticulate" means particles having an average particle size ranging from 1 µm to 100 µm.

The term "is formed in whole or in part" is synonymous with the term "comprises". In other words, it means that further ingredients may also be contained.

SiOC Composite Material

As emerges from the foregoing, the SiOC composite material according to the invention is made of microparticles formed, in whole or in part, of an amorphous silicon oxycarbide network of formula SiOC, also referred to as "SiOC matrix", where Si ranges from 20 wt % to 60 wt %, O ranges from 20 wt % to 40 wt % and C ranges from 10 wt % to 50 wt %, based on the total weight of the SiOC matrix, wherein amorphous or crystallized silicon particles are embedded within said SiOC matrix and wherein the microparticles are of core/coating structure with a core formed of said amorphous SiOC matrix and coated with at least one amorphous carbon layer.

In other words, the present invention is directed to SiOC composite material in the form of microparticles comprising an amorphous silicon oxycarbide network of formula SiOC, also referred to as "SiOC matrix", with Si ranging from 20 wt % to 60 wt %, O ranging from 20 wt % to 40 wt % and C ranging from 10 wt % to 50 wt %, based on the total weight of the SiOC matrix, wherein amorphous or crystallized silicon particles are embedded within said SiOC matrix and wherein the microparticles are of core/coating structure with a core formed of said amorphous SiOC matrix and coated with at least one amorphous carbon layer.

Although unaccounted for in the formula "SiOC matrix", hydrogen may also be present in trace amounts, in particular less than 2 wt % based on the total weight of the SiOC matrix.

Amorphous or crystallized silicon particles are trapped in said SiOC matrix. Preferably, said silicon particles are uniformly distributed in the SiOC matrix.

Said amorphous or crystallized silicon particles may have an average size ranging from 2 nm to 2 µm, in particular from 50 nm to 800 nm. Said particle size can be determined by known methods, for example by the laser diffraction technic or SEM observation.

More particularly, said silicon particles may be present in the SiOC matrix in a weight ratio SiOC matrix/Si particles ranging from 2 to 20, in particular from 5 to 15.

In a particularly preferred embodiment variant, the silicon particles embedded in the SiOC matrix are in crystallized form. Within the context of this variant, the crystallized silicon has more particularly a cubic crystalline structure. This may be evaluated by X-ray diffraction analysis.

According to an embodiment variant, the microparticles are formed of the amorphous SiOC matrix, wherein amorphous or crystallized silicon particles are embedded within said SiOC matrix.

The microparticles have a core formed of said amorphous SiOC matrix and coated with at least one amorphous carbon layer.

The core of microparticles according to this particular variant formed by the silicon-enriched SiOC matrix may have an average particle size, for example obtained by laser diffraction analysis, ranging from 1 µm to 100 µm, in particular from 5 µm to 50 µm.

The silicon-enriched SiOC core may be coated by an amorphous carbon layer.

In particular, the coating rate may be less than or equal to 50 wt %, more particularly comprised between 10 wt % and 30 wt %.

The carbon layer formed at the surface of the silicon oxycarbide cores may have a thickness ranging from 1 nm to 200 nm, and especially from 5 nm to 50 nm.

Without wishing to be bound by the theory, it can be assumed that the carbon coating acts as relaxing agent for volume change during the cation insertion/extraction (for example lithium insertion/extraction in the case of a lithium-ion battery), thus enabling improved cycle durability.

The particulate SiOC composite material of the invention may have an average particle size ranging from 1 µm to 100 µm, in particular from 5 µm to 50 µm.

The average particle size may be obtained by laser diffraction analysis according to a technique known to a person skilled in the art.

According to a particular embodiment, the aforementioned composite material presents a specific surface area measured by the Brunauer Emmett Teller (BET) method ranging from 1 $m^2/g$ to 100 $m^2/g$, preferably from 1 $m^2/g$ to 55 $m^2/g$.

Further, advantageously, the microparticles of the material of the invention have a globally spherical shape, i.e. a spherical shape (without considering the irregularities of the surface). Preferably, the SiOC composite material of the invention is a material in which the adsorption isotherm of nitrogen is classified into TYPE III defined in IUPAC. This also means that the microparticles forming the composite material of the invention are non-porous.

Method for Producing the SiOC Composite Material

According to another of its aspects, the invention relates to a method for producing a particulate SiOC composite material, in particular as described above, comprising at least the steps, in that order, of:

(i) providing a product consisting of at least one silicon-containing polymer in admixture with amorphous or crystallized silicon particles;

(ii) pyrolysing the product of step (i) to yield an amorphous SiOC matrix with Si ranging from 20 wt % to 60 wt %, O from 20 wt % to 40 wt % and C from 10 wt % to 50 wt %, based on the total weight of the SiOC matrix, wherein amorphous or crystallized silicon particles are embedded within said SiOC matrix;

(iii) processing the pyrolysis product obtained in step (ii) into a powder form with an average particle size ranging from 1 µm to 100 µm; and (iv) forming an amorphous carbon coating on the surface of the particles of the powder obtained in step (iii), to obtain the desired SiOC composite material of core/coating structure.

Step (i): Silicon-Loaded Polymer Material

As specified previously, step (i) of the process of the invention consists in providing a silicon-containing polymer material in admixture with amorphous or crystallized silicon particles, referred below as "Si-loaded polymer".

The silicon-containing polymer used in step (i) of the process of the invention may be of various natures. In particular, it may be chosen from polycarbosilanes, polysilanes, polysiloxanes and polysilsesquioxanes.

Generally, polycarbosilanes contain units of the type $(R^1R^2SiCH_2)$, $(R^1Si(CH_2)_{1.5})$ and/or $(R^1R^2R^3Si(CH_2)_{0.5})$ where each $R^1$, $R^2$ and $R^3$ is independently selected from hydrogen and hydrocarbons having 1-20 carbon atoms. The hydrocarbons can include alkyls such as methyl, ethyl, propyl and butyl; alkenyls such as vinyl and allyl; and aryls such as phenyl. In addition, the hydrocarbon groups can contain hetero atoms such as silicon, nitrogen or boron. The polycarbosilanes may also be substituted with various metal groups such as aluminum, chromium and titanium. The substituted polycarbosilanes are also known in the art and can be manufactured by known methods.

The polysilanes useful herein are known in the art and generally contain units of the formula $(R^1R^2R^3Si)$, $(R^1R^2Si)$ and $(R^3Si)$ wherein $R^1$, $R^2$ and $R^3$ are as described above. Examples of specific polysilane units are $(Me_2Si)$, $(PhMeSi)$, $(MeSi)$, $(PhSi)$, $(ViSi)$, $(PhHSi)$, $(MeHSi)$, $(MeViSi)$, $(Ph_2Si)$, $(PhViSi)$, $(Me_3Si)$ and others, wherein Me is methyl, Ph is phenyl and Vi is vinyl. The polysilane may also be substituted with various metal groups (i.e., containing repeating metal-Si units). Examples of suitable metals include aluminum, chromium and titanium.

The polysiloxanes useful herein are known in the art and are of the structure:

$(R^1R^2R^3SiO_{0.5})_w(R^4R^5SiO)_x(R^6SiO_{1.5})_y(SiO_{4/2})_z$ wherein $R^1$, $R^2$, $R^3$, $R^4$, $R^5$ and $R^6$ are as described above and w, x, y and z are mole fractions with w=0 to 0.8, x=0.3 to 1, y=0 to 0.9, z=0 to 0.9 and w+x+y+z=1.

Examples of specific siloxane units include $(MeSiO_{1.5})$, $(PhSiO_{1.5})$, $(ViSiO_{1.5})$, $(HSiO_{1.5})$, $(PhMeSiO)$, $(MeHSiO)$, $(PhViSiO)$, $(MeViSiO)$, $(Ph_2SiO)$, $(Me_2SiO)$, $(Me_3SiO_{0.5})$, $(Ph_2ViSiO_{0.5})$, $(Ph_2HSiO_{0.5})$, $(H_2ViSiO_{0.5})$, $(Me_2ViSiO_{0.5})$, $(SiO_{4/2})$ and other wherein Me is methyl, Ph is phenyl and Vi is vinyl.

Polysilsesquioxanes useful herein are known in the art. Generally, these polysilsesquioxanes contain units of the type $(RSiO_{3/2})_x$ wherein R is a hydrocarbon group, saturated or unsaturated, linear, branched or cyclic, for example of the type $-C_nH_{2n+1}$, with n being an integer ranging from 1 to 20, especially a methyl, ethyl, propyl, butyl, pentyl, hexyl, heptyl, octyl, nonyl, decyl, dodecyl, tridecyl, tetradecyl, hexadecyl, octadecyl and eicosyl; an aryl group, especially phenyl or tolyl group; a cycloalkyl, particularly cyclobutyl, cyclopentyl or cyclohexyl; alkenyl, especially vinyl or allyl; or aralkyl including 2-phenylethyl or benzyl, R can also contain hetero atoms, in particular nitrogen or halogen, preferably R is methyl, ethyl, propyl or phenyl. R may be combination of two or more kinds of different groups. x is the number of patterns, and can be between 4 and 10,000.

Within the meaning of the invention, the expression "silicon-containing" polymer as used herein is intended to include copolymers or blends of the above silicon-containing polymers and other polymers which are also useful herein. For instance, copolymers of silicon-containing polymers and silalkylenes $(R_2Si(CH_2)SiR_2O)$ such as silethylene, silarylenes such as silphenylene $(R_2Si(C_6H_4)_nSiR_2O)$, silazanes $(R_2SiN)$, silanes $(R_2Si-SiR_2)$, organic polymers and others can be used herein. The silicon-containing polymer, as described above, may be used alone or in combination with two or more types thereof.

The silicon-containing polymer is capable to yield under pyrolysis to the aforementioned amorphous SiOC matrix.

According to one particularly preferred embodiment, said silicon-containing polymer is a polysilsesquioxane.

Preferably, silicon-containing polymers which contain phenyl groups are used.

By way of example, the silicon-containing polymer used in the process according to the invention is phenyl-bridged polysilsesquioxane that is $(PhSiO_{1.5})_n$ or methyl/phenyl-bridged polysilsesquioxane that is $(MeSiO_{1.5})_m(PhSiO_{1.5})_n$.

The silicon-containing polymer is loaded with amorphous or crystallized silicon particles. Preferably, silicon particles are in crystallized form.

Said amorphous or crystallized silicon particles may have an average particle size ranging from 2 nm to 2 μm, in particular from 50 nm to 800 nm.

According to a first embodiment variant, the Si-loaded polymer of step (i) may be prepared by mixing at least one silicon-containing polymer in a solid state, in particular in an amorphous form, and a crystallized or amorphous silicon powder.

In particular, said Si-loaded polymer may be produced by mixing both compounds by mechanical milling, for example using a bowl and balls. Eventually, an organic solvent (for example, acetone) may be added to facilitate mixing.

The adjustment of milling conditions falls within the abilities of a person skilled in the art. More particularly, the mechanical milling may be carried out at a milling speed ranging from 10 rpm to 1,000 rpm, preferentially from 100 rpm to 400 rpm. The milling time may be comprised between 1 minute and 100 hours, in particular between 10 minutes and 2 hours.

Naturally, other blending techniques can be used to get the Si-loaded polymer.

Thus, according to another embodiment variant, the Si-loaded polymer in step (i) may be prepared by addition of an amorphous or crystallized silicon powder to silicon-containing polymer dissolved in a suitable solvent (for example, acetone), followed by spray drying or evaporation of the solvent.

According to yet another embodiment variant, the Si-loaded polymer in step (i) may be prepared by synthetizing the silicon-containing polymer by a sol-gel method in the presence of a crystallized or amorphous silicon powder, as illustrated in examples 6 and 8 below.

The sol-gel techniques, in particular the choice of suitable silane precursors to yield the silicon-containing polymer, clearly fall within the abilities of a person skilled in the art.

According to a particular embodiment, the Si-loaded polymer of step (i) may be in powder form.

The silicon-containing polymer enriched in silicon particles may be formed into a powder by means of pulverization treatment or a granulation treatment, if necessary. The pulverization or granulation methods can be carried out by means of a common pulverizer such as a ball mill, or a common granulator such as pelletizer.

Step (ii): Pyrolysis

In a consecutive second essential step of the process of the invention, the product of step (i), eventually in powder form, is pyrolysed to yield an amorphous SiOC matrix as specified above wherein silicon particles are embedded in said SiOC matrix.

The pyrolysis may be carried out in an inert or reductive gaseous atmosphere. As examples of the inert gas, mention may be made of nitrogen, helium and argon. A reducing gas such as a hydrogen gas may be included in the aforementioned inert gas. For example, the pyrolysis step may be carried out in argon or argon-$H_2$. Inert atmospheres are used during pyrolysis to prevent oxygen incorporation into the silicon oxycarbide matrix or loss of carbon through combustion.

The adjustment of the temperature and time conditions of the pyrolysis to reach the desired product falls within the abilities of a person skilled in the art.

In particular, the product may be pyrolysed by heating to a temperature (finally reachable temperature) ranging from 600° C. to 1,400° C., in particular from 900° C. to 1,300° C. and more particularly from 1,000° C. to 1,200° C.

The heating rate may range from 1° C./min to 30° C./min, in particular from 2° C./min to 10° C./min to reach the final pyrolysis temperature. The pyrolysis step may be held to a fixed temperature before reaching the final pyrolysis temperature.

The heating duration at final temperature may be comprised between 5 minutes and 10 hours, in particular between 30 minutes and 5 hours.

Pyrolysis of the product may be performed in any conventional high temperature furnace equipped with a means to control the furnace atmosphere. Such furnaces such as tubular furnaces are well known in the art and many are commercially available. The product to be pyrolysed is, for example, fed into a crucible made of quartz or alumina.

The resultant pyrolysed product, obtainable as a black solid, is formed of an amorphous SiOC matrix as specified above in which particles of amorphous or crystallized silicon are trapped.

The silicon particles may be present in the SiOC matrix in a weight ratio SiOC matrix/Si particles ranging from 2 to 20, in particular from 5 to 15.

Step (iii): Formation of a Powder

In a third step (iii) of the process of the invention, the pyrolysis product obtained in step (ii) is ground into a powder having an average particle size in a range of 1 µm to 100 µm.

A person skilled in the art is able to carry out known techniques to process the pyrolysis product into the desired powder form, such as by grinding or milling (for example in ball mill, a jet mill or hammer mill).

By way of example, the powder may be produced by mechanically milling, for example by using a bowl and balls.

The milling speed may range from 10 rpm to 1,000 rpm, in particular from 200 rpm to 600 rpm. As for the milling time, it may be comprised between 1 minute and 100 hours, in particular between 10 minutes and 2 hours.

Preferably, the powder of pyrolysis product has an average particle size in a range of 1 µm to 100 µm, in particular of 5 µm to 50 µm.

Step (iv): Carbon Coating

The process finally involves a step (iv) directed toward coating the powder particles obtained at the end of step (iii) with an amorphous carbon layer.

According to one particular embodiment variant, said carbon coating may be formed by:

(a) coating the particles with at least one organic carbon precursor containing no silicon atoms and being able to be transformed into carbon during a pyrolysis process; and then, (b) pyrolysing said coated particles to obtain the carbon coating.

Organic compounds suitable for forming carbon by pyrolysis are well-known. In particular, the organic carbon precursor may be chosen from polyvinylidene difluoride (PVdF), sucrose, chlorinated polyethylene, polyvinyl chloride, polyethylene, phenolic resin, polyethylene oxide, pitch, polyvinyl alcohol (PVA), polystyrene, carboxymethyl cellulose or a salt thereof, alginic acid, oxalic acid including sodium or potassium salt, polyacrylic acid or a salt thereof, polyacrylonitrile and polyvinyl fluoride.

According to one particularly preferred embodiment, said carbon precursor is a polyvinyl alcohol.

The coating made of carbon precursor can be formed by conventional methods.

A person skilled in the art is able to carry out known techniques to form a coating of carbon precursor on the surface of the particles.

By way of example, the carbon precursor may be dissolved in a suitable aqueous or organic solvent. The pyrolysed powder obtained at the end of step (iii) is then added to the solution of carbon precursor, and the resulting mixture can then be dried, for example by spray-drying to reach the coated particles.

The coating of carbon precursor may also be obtained by other standard methods, for example by chemical vapor deposition technic, mechanical milling or freeze drying.

The amount of carbon precursor necessary to obtain the carbon coating clearly falls within the abilities of a person skilled in the art.

According to a particular embodiment, the carbon precursor is crosslinkable. Within the context of this variant, the particles coated with said crosslinkable carbon precursor may be subjected, prior to the pyrolysis step (b), to a pre-treatment, in particular a heat-treatment, in order to induce the crosslinking of said carbon precursor.

The heat-treatment may be performed under air at a temperature ranging from 50° C. to 400° C. for 1 hour to 30 hours.

As seen previously for the pyrolysis step (ii), the adjustment of the pyrolysis conditions in step (b) to yield the desired carbon coating comes within the abilities of a person skilled in the art.

In particular, the pyrolysis may be carried out in an inert or reductive gaseous atmosphere, such as argon or argon-$H_2$.

By way of example, the pyrolysis temperature (finally reachable temperature) may range from 600° C. to 1,400° C., in particular from 900° C. to 1,100° C.

The heating rate may range from 1° C./min to 30° C./min, in particular from 2° C./min to 10° C./min to reach the final temperature. The heating duration at final temperature may be comprised between 5 minutes and 10 hours, in particular between 30 minutes and 3 hours.

The final powder has a particle size, obtained for example by laser diffraction analysis, ranging from 1 µm to 100 µm, in particular from 5 µm to 50 µm.

As will be seen from the examples below, it is important to follow the steps (i) to (iii) and optional step (iv) in the order they are presented above to achieve a final electrode active material that presents improved electrochemical performance.

Application

The aforementioned SiOC composite material according to the invention can be used as an electrode active material for forming an electrode.

Advantageously, the SiOC composite material is in a powder form, which makes it easier its use for forming electrodes.

Preferably, the SiOC composite material of the present invention is suitable as a material of a negative electrode, in particular for a lithium-ion battery.

The preparation of an electrode comprising the SiOC composite material of the invention and its use into the desired battery fall within the abilities of a person skilled in the art.

More particularly, the SiOC composite material of the invention may be mixed with a variety of well-known conductive agents and/or binders to assist in forming the desired shape electrode.

In a classic way, an electrode according to the invention can have a collector on which the active material of the invention is applied. As examples of collector for a negative electrode, mention may be made of mesh, foil or the like of a metal such as copper, nickel, or alloys thereof, or the like. The thickness of the electrode active material on the collector may range from 5 μm to 300 μm, in particular from 10 μm to 100 μm.

As examples of conductive agents, mention may be made of carbon fibers, carbon black (such as Ketjen black, acetylene black, or the like), carbon nanotubes, and the like.

As examples of binders that may be comprised in an electrode according to the invention, mention may be made of fluorine-based binder, such as polytetrafluoroethylene or polyvinylidene difluoride binder, polyacrylic acid or a salt thereof, sodium alginate, carboxymethyl cellulose or a salt thereof, polysaccharides or latex such as styrene-butadiene rubber.

An electrode according to the invention may comprise any other additives commonly used in electrodes.

The electrode according to the present invention can be used in any battery configuration. According to yet another of its aspects, one subject of the present invention is a battery comprising an electrode according to the invention.

As examples of batteries, mention may be made of a lithium ion primary battery, a lithium ion secondary battery, a capacitor, a hybrid capacitor, an organic radical battery, or a dual carbon battery.

As the aforementioned battery, a lithium-ion battery, especially a lithium-ion secondary battery is particularly preferable.

The lithium-ion secondary battery can be produced in accordance with conventional methods. In general, a lithium-ion battery comprises two electrodes, for example a negative electrode formed from the aforementioned electrode, a positive electrode capable of charging and discharging lithium and an electrolyte.

As examples of electrolyte solution, mention may be made of, for examples, lithium salts such as $LiClO_4$, $LiAsF_6$, $LiPF_4(C_2O_4)$, $LiPF_6$, $LiBF_4$, $LiR_FSO_3$, $LiCH_3SO_3$, $LiN(R_FSO_2)_2$, $LiC(R_FSO_2)_3$; $R_F$ being chosen from a fluorine or perfluoroalkyl of 1 to 8 carbon atoms. The salt is preferably dissolved in a polar aprotic solvent such as ethylene carbonate, propylene carbonate, ethylmethyl carbonate, dimethyl carbonate, diethyl carbonate, and the like. It may be supported by a separator sandwiched between the two electrodes. Well-known separators such as polyolefin-based porous membranes such as porous polypropylene nonwoven fabric, porous polyethylene nonwoven fabric and the like can be used.

A person skilled in the art is able to choose the type and amount of the battery components based on component material properties and the desired performance and safety requirements of the battery.

For example, the battery may be in the form of a conventional spiral wound type or a coin-cell type battery. Other configurations or components are possible.

The examples and figures which follow are presented by way of illustration and are non-limitative of the field of the invention.

EXAMPLES

Example 1

Preparation of a SiOC Composite Material in Accordance with the Invention

A sample of 28.850 g of amorphous phenyl-bridged polysilsesquioxane compound and 6.053 g of crystallized silicon were put together in a bowl and milled for 1 hour at a speed of 150 rpm.

The obtained powder was then pyrolysed under argon atmosphere for 1 hour at 1,000° C.

After pyrolysis, the sample was recovered and milled at a speed of 400 rpm for 30 minutes.

The obtained powder was added to an aqueous solution containing PVA (62.5 g/L) dissolved at 60° C. The obtained mixture was spray-dried at 100° C. and a powder was recovered.

This powder was heat treated at 200° C. for 16 hours under air, and then pyrolysed at 1,000° C. for 1 hour under argon atmosphere.

Analysis of the Obtained Powder

Elemental Analysis

The silicon content of the obtained powder is measured by inductively coupled plasma (ICP) emission spectrophotometry. Carbon content is measured by infrared absorption method after combustion in high frequency induction furnace. Oxygen content is measured as carbon monoxide and carbon dioxide by a non-dispersive infrared detector.

The elemental analysis of the obtained powder thus confirms the presence of Si (32.0 wt %), C (36.7 wt %) and O (31 wt %).

SEM Analysis

Figure 1:
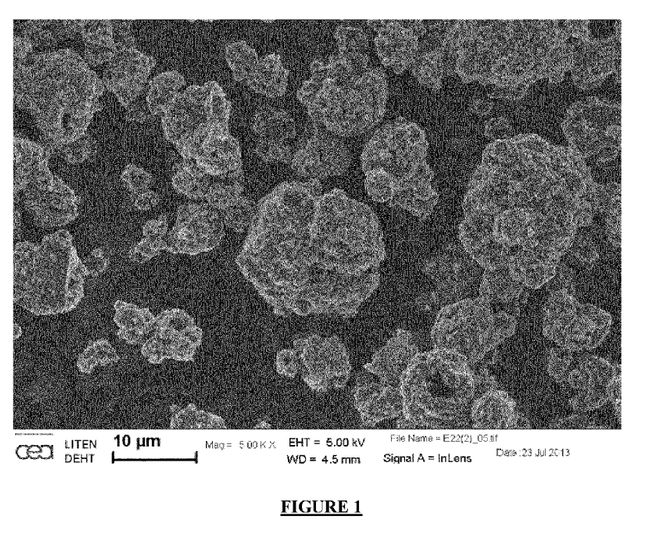
FIG. 1: SEM picture of a SiOC composite powder in accordance with the invention synthetized in example 1.

The observation of the powder by Scanning Electron Microscopy (SEM) (FIG. 1) shows that the particles have a spherical shape.

Laser Diffraction Analysis

Figure 2:
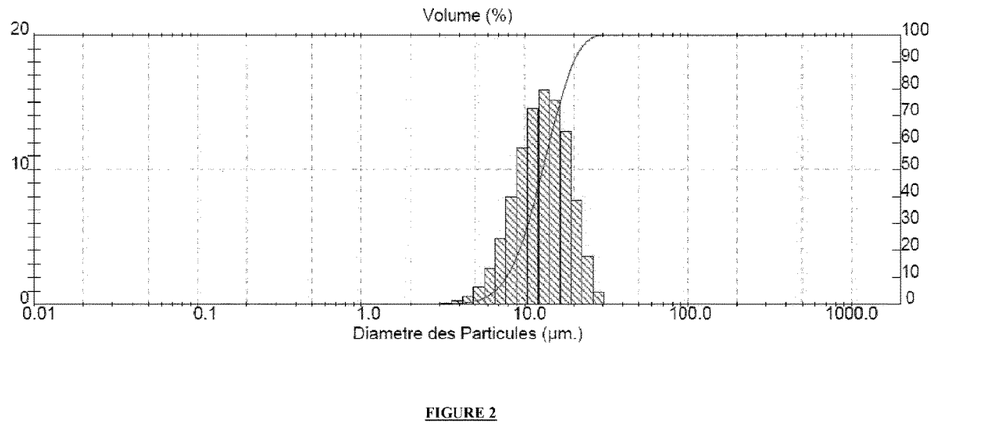
FIG. 2: Particle size distribution diagram obtained by laser diffraction measurement of the SiOC composite powder synthetized in example 1.

The particle size distribution obtained by laser diffraction measurement is represented in FIG. 2. The obtained powder has an average particle size of around 10-20 μm.

TEM Analysis

The powder is analyzed by transmission electron microscopy (TEM), and element mapping obtained from energy dispersive X-ray spectrometry (EDX) measurement in TEM shows the presence of a carbon coating on the surface of the particles.

Adsorption Isotherm of Nitrogen

Figure 3:
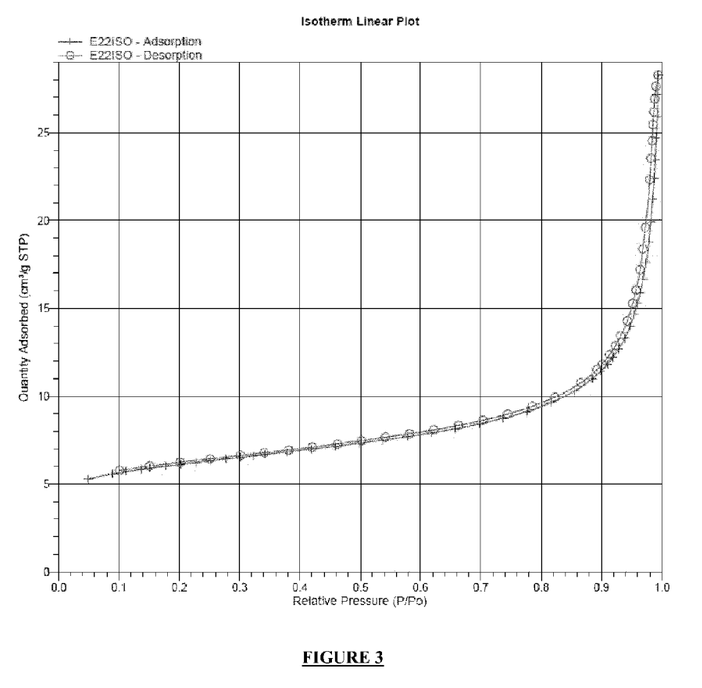
FIG. 3: Nitrogen adsorption isotherm of the SiOC composite powder synthetized in example 1.

The nitrogen adsorption isotherm of the obtained powder is shown in FIG. 3. This is classified into TYPE III according to IUPAC.

X-Ray Diffraction Analysis

Figure 4:
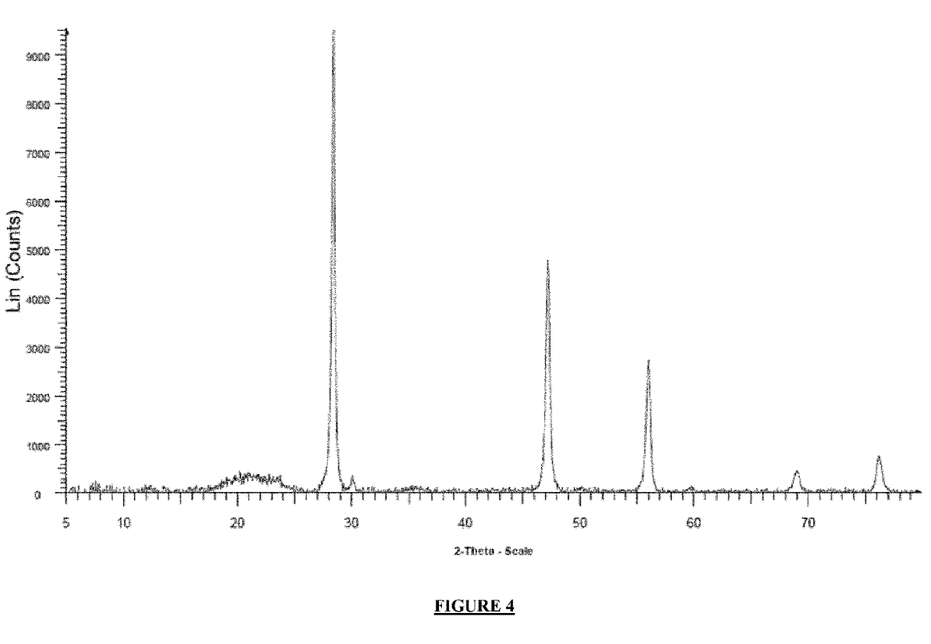
FIG. 4: X-ray diffraction pattern of the SiOC composite powder synthetized in example 1.

The X-ray diffraction pattern of the obtained powder is represented in FIG. 4. It reveals a cubic crystalline silicon phase in the final powder coming from the silicon particles trapped in the SiOC amorphous matrix.

BET Specific Surface Area

The BET specific surface area, measured by the nitrogen adsorption technic, of the obtained powder, is 18 $m^2/g$.

Example 2 (Comparative Example)

A sample of 10 g of phenyl-bridged polysilsesquioxane compound was pyrolysed at 1,000° C. for 1 hour under argon atmosphere.

The recovered sample was then milled at a speed of 400 rpm for 5 min.

The obtained powder was added to an aqueous solution containing dissolved PVA (62.5 g/L) and dispersed particles of crystallized silicon (27.4 g/L).

The mixture was spray-dried at 100° C. and a powder was recovered.

This powder was heat treated at 200° C. for 16 hours under air and then pyrolysed at 1,000° C. for 1 hour under argon atmosphere.

Example 3

Preparation of a SiOC Composite Material in Accordance with the Invention

A sample of 28.850 g of amorphous phenyl-bridged polysilsesquioxane compound and 6.053 g of crystallized silicon were put together in a bowl and milled for 1 hour at a speed of 150 rpm.

The obtained powder was then pyrolysed under argon atmosphere for 1 hour at 1,000° C.

After pyrolysis, the sample was recovered and milled at a speed of 400 rpm for 30 min.

An amount of 6.25 g of solid PVA was added in the bowl and the mixture was milled for 1 hour at a speed of 150 rpm. A powder was recovered. This powder was heat treated at 200° C. for 16 hours under air, and then pyrolysed at 1,000° C. for 1 hour under argon atmosphere.

Example 4

Preparation of a SiOC Composite Material in Accordance with the Invention

A sample of 10.070 g of amorphous methyl/phenyl (4/1) bridged polysilsesquioxane compound, 1.688 g of crystallized silicon and 20 mL of acetone were put together in a bowl and milled for 1 hour at a speed of 200 rpm.

The obtained mixture was dried in an oven at 60° C. overnight. The resulting dried product was pyrolysed under argon atmosphere for 5 hour at 1,150° C.

After pyrolysis, the sample was recovered and milled at a speed of 400 rpm for 5 min.

The obtained powder was added to an aqueous solution containing PVA (62.5 g/L) dissolved at 60° C. The obtained mixture was spray-dried at 100° C. and a powder was recovered.

This powder was heat treated at 200° C. for 16 hours under air and then pyrolysed at 1050° C. for 1 hour under argon atmosphere.

Example 5

Preparation of a SiOC Composite Material in Accordance with the Invention

A sample of 8 g of amorphous methyl/phenyl (4/1) bridged polysilsesquioxane compound was put in solution in 200 mL of acetone.

The solution was heated at 55° C. under magnetic stirring for 10 min. A sample of 1.3 g of crystallized silicon was added to the solution. Acetone was then evaporated with a rotary evaporator.

The obtained dried product was pyrolysed under argon atmosphere for 5 hour at 1,150° C.

After pyrolysis, the sample was recovered and milled at a speed of 400 rpm for 5 min.

The obtained powder was added to an aqueous solution containing PVA (62.5 g/L) dissolved at 60° C. The obtained mixture was spray-dried at 100° C. and a powder was recovered.

This powder was heat treated at 200° C. for 16 hours under air and then pyrolysed at 1,050° C. for 1 hour under argon atmosphere.

Example 6

Preparation of a SiOC Composite Material in Accordance with the Invention $PhSi(OMe)_3$ and $MeSi(OMe)_3$ were both dissolved in methanol. Then, a required amount of crystallized silicon was added to the previous mixture. The obtained solution was stirred for several minutes at room temperature. Then, a required amount of hydrochloric acid was added and the solution was stirred for several minutes at 60° C.

The obtained Si-loaded polysilsesquioxane material was washed and dried before pyrolysis at 1,200° C. for 5 hours under argon. After pyrolysis, the sample was recovered and milled at a speed of 400 rpm for 30 min.

An amount of 6.25 g of solid PVA was added in the bowl and the mixture was milled for 1 h at a speed of 150 rpm. A powder was recovered.

This powder was heat treated at 200° C. for 16 hours under air and then pyrolysed at 1,050° C. for 1 hour under argon atmosphere.

Example 7

Use of the Material as Electrode Active Material

For each of examples 1 to 3, slurry containing the obtained material, carboxymethyl cellulose (CMC) used as binder and vapor grown carbon fibers (VGCF) used as conductive agent was coated on a 12 µm cupper foil and used as electrode.

The electrode was used in coin-cell type battery in order to evaluate the electrochemical performance of the material. The other electrode was lithium metal. The two electrodes were separated by a Celgard 2400 separator and the battery was filled with a $LiPF_6$-containing electrolyte. Electrochemical performances were evaluated at a C-rate of C/10.

Results

Figure 5:
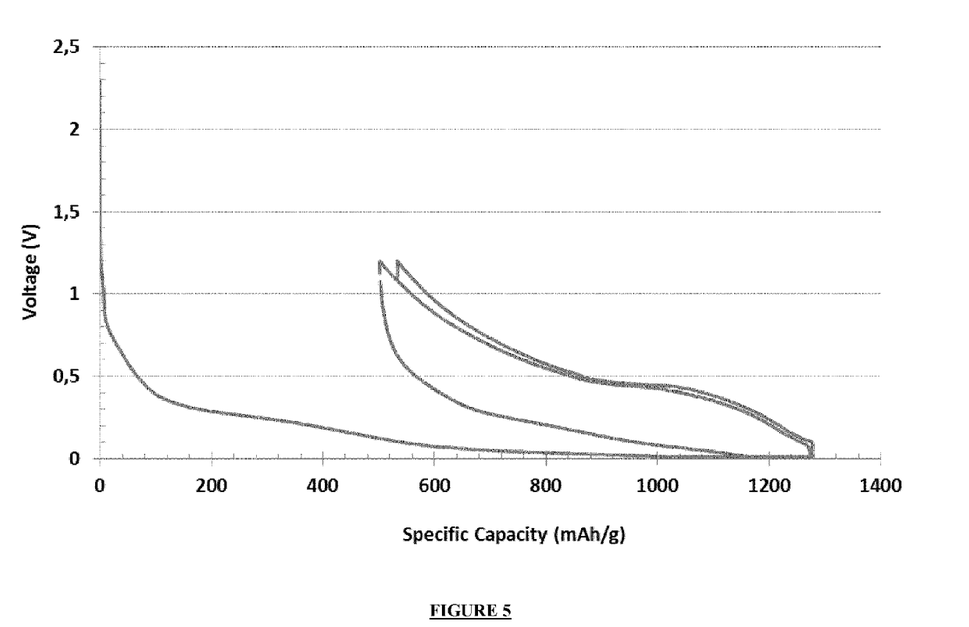
FIG. 5: Voltage profile obtained with the battery prepared according to example 7 with the SiOC material synthetized in example 1.

FIG. 5 shows the voltage profile for the first two charge-discharge cycles (obtained from a galvanostatic measurement at a C rate of C/10 between 0.01 and 1.2 V) of the battery prepared with the SiOC material obtained in example 1.

Figure 6:
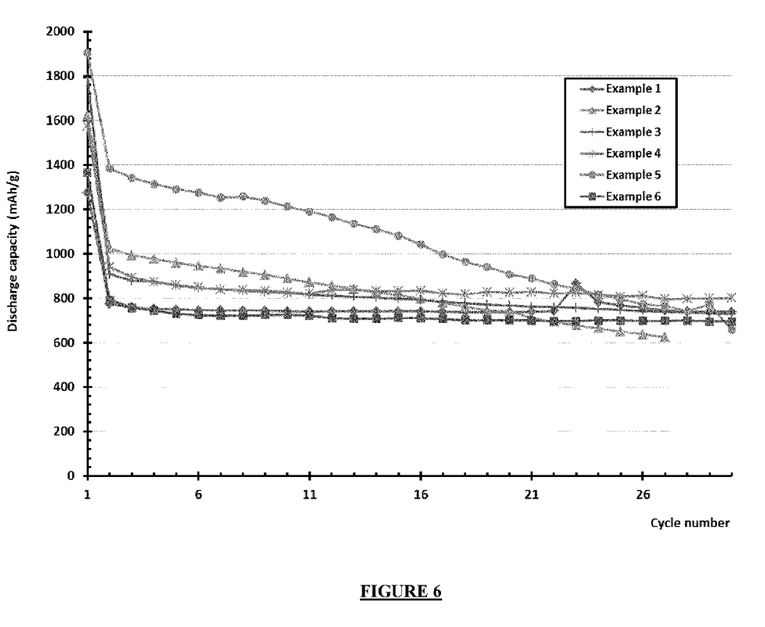
FIG. 6: Electrochemical performances (capacity v/s number of cycles) of the batteries prepared according to example 7 from the materials synthetized in examples 1 to 6.

The electrochemical performances (capacity v/s number of cycles) of the batteries prepared from anode materials of examples 1 to 6 are shown in FIG. 6.

The anode materials using the SiOC composite materials of the invention (examples 1, 3, 4, 5 and 6) provide high capacity even after more than 20 cycles, whereas the capacity obtained with the electrode material of example 2 not in accordance with the invention deteriorates over time after 20 cycles.

Thus, the SiOC material of the invention provides a superior anode material for both capacity and cycle durability.

Example 8

Preparation of a SiOC Composite Material in Accordance with the Invention and Use as an Electrode Active Material PhSi(OMe)$_3$ and MeSi(OMe)$_3$ were both dissolved in methanol. Then, a required amount of crystallized silicon was added to the previous mixture. The obtained solution was stirred for several minutes at room temperature. Then, a required amount of hydrochloric acid was added and the solution was stirred for several minutes at 60° C.

The obtained Si-loaded polysilsesquioxane material was washed and dried before pyrolysis at 1,200° C. for 5 hours under argon. After pyrolysis, the sample was recovered and milled at a speed of 400 rpm for 30 min.

Figure 7:
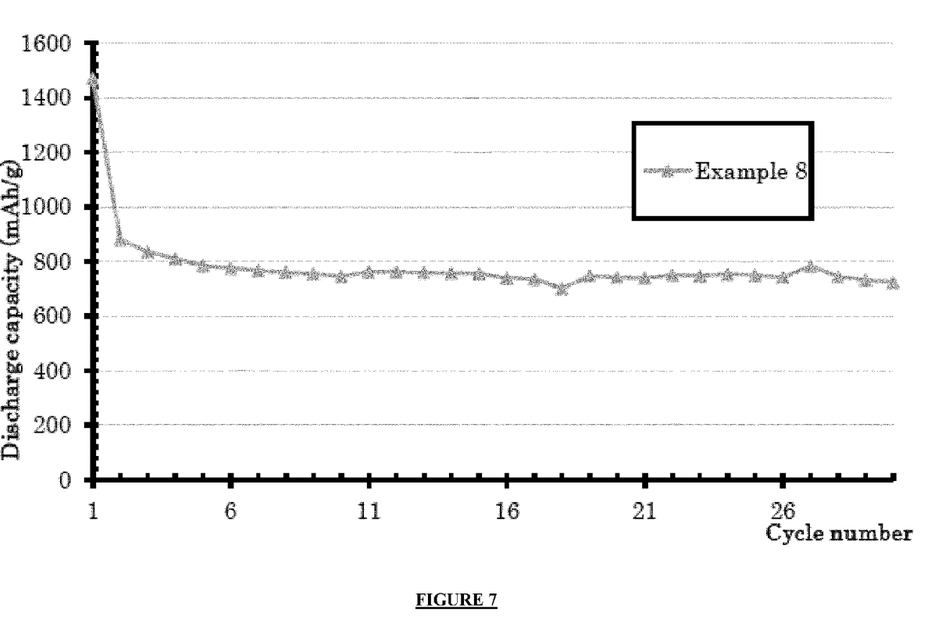
FIG. 7: Electrochemical performances (capacity v/s number of cycles) of the battery prepared from the SiOC composite material synthetized in example 8.

The electrochemical performances (capacity v/s number of cycles) of a battery, prepared as described in previous example 7, from the obtained material are shown in FIG. 7.

REFERENCES

[1] Fukui et al., Appl. Mater Interfaces, 2010 April (4), 998-1008;
[2] Fukui et al., Journal of Power Sources, 196 (2011), 371-378;
[3] Fukui et al., Journal of Power Sources, 243 (2013), 152-158;

The invention claimed is:

1. A silicon oxycarbide (SiOC) composite material formed with microparticles, wherein the microparticles are formed, in whole or in part, of an amorphous SiOC matrix, with Si ranging from 20 wt % to 60 wt %, 0 from 20 wt % to 40 wt % and C from 10 wt % to 50 wt %, based on a total weight of the amorphous SiOC matrix,
wherein amorphous or crystallized silicon particles are embedded within said amorphous SiOC matrix, and
wherein the microparticles are of a core/coating structure with a core formed of said amorphous SiOC matrix and coated with a pyrolyzed coating containing at least one amorphous carbon layer.

2. The SiOC composite material according to claim 1, wherein the microparticles have an average particle size ranging from 1 µm to 100 µm.

3. The SiOC composite material according to claim 1, having a Brunauer Emmett Teller specific surface area ranging from 1 m$^2$/g to 100 m$^2$/g.

4. The SiOC composite material according to claim 1, wherein the microparticles have a spherical shape.

5. The SiOC composite material according to claim 1, for which an adsorption isotherm of nitrogen is classified in TYPE III.

6. The SiOC composite material according to claim 1, wherein crystallized silicon particles are embedded in said amorphous SiOC matrix, the crystallized silicon having a cubic crystalline structure.

7. A method for producing a SiOC composite material in microparticulate form, comprising at least the following steps, in that order, of:
(i) providing a product consisting of at least one silicon-containing polymer in admixture with amorphous or crystallized silicon particles;
(ii) pyrolysing the product of step (i) to yield an amorphous SiOC matrix with Si ranging from 20 wt % to 60 wt %, 0 from 20 wt % to 40 wt % and C from 10 wt % to 50 wt %, based on a total weight of the amorphous SiOC matrix, wherein amorphous or crystallized silicon particles are embedded within said amorphous SiOC matrix, to form a pyrolysis product;
(iii) processing the pyrolysis product obtained in step (ii) into a powder form with an average particle size ranging from 1 µm to 100 µm; and
(iv) forming an amorphous carbon coating on the surface of the particles of the powder obtained in step (iii) by pyrolyzing said particles previously coated with at least one organic carbon precursor containing no silicon atoms,
to obtain the SiOC composite material of core/coating structure.

8. The method according to claim 7, wherein the silicon-containing polymer is a polysilsesquioxane.

9. The method according to claim 7, wherein said amorphous or crystallized silicon particles have an average size ranging from 2 nm to 2 µm.

10. The method according to claim 7, wherein the product in step (i) is prepared by mixing the at least one silicon-containing polymer in a solid state with the amorphous or crystallized silicon particles in a powder form.

11. The method according to claim 7, wherein the product in step (i) is prepared by addition of the amorphous or crystallized silicon particles in a powder form to the at least one silicon-containing polymer dissolved in a solvent, followed by spray drying or evaporation of the solvent.

12. The method according to claim 7, wherein the product in step (i) is prepared by synthesizing the silicon-containing polymer by a sol-gel method in the presence of the amorphous or crystallized silicon particles in a powder form.

13. The method according to claim 7, wherein the product is pyrolysed in step (ii) by heating at a rate ranging from 1° C./min to 30° C./min, to a temperature in a range of 600° C. to 1,400° C., with the heating duration at final temperature ranging from 5 minutes to 10 hours.

14. The method according to claim 7, wherein the carbon coating of step (iv) is formed by:
(a) coating the particles obtained in step (iii) with at least one organic carbon precursor containing no silicon atoms and being able to be transformed into carbon during a pyrolysis process, to form coated particles; and then
(b) pyrolysing said coated particles to obtain the carbon coating.

15. The method according to claim 14, wherein the organic carbon precursor is selected from the group consisting of polyvinylidene difluoride, sucrose, chlorinated polyethylene, polyvinyl chloride, polyethylene, phenolic resin, polyethylene oxide, pitch, polyvinyl alcohol, polystyrene, carboxymethyl cellulose or a salt thereof, alginic acid, oxalic acid including sodium or potassium salt, polyacrylic acid or a salt thereof, polyacrylonitrile and polyvinyl fluoride.

16. An electrode active material comprising at least a SiOC composite material as defined in claim 1.

17. An electrode comprising an electrode active material as defined in claim 16.

18. The electrode according to claim 17, which is an anode electrode, in particular a lithium-ion battery anode.

19. A battery, comprising an electrode as defined in claim 17.

20. The battery according to claim 19, which is a lithium-ion battery.

* * * * *